(12) United States Patent
Flegel

(10) Patent No.: US 6,504,268 B1
(45) Date of Patent: Jan. 7, 2003

(54) TRANSFER SWITCH WITH SELECTIVELY CONFIGURABLE COVER STRUCTURE WITH POWER INPUT AND METER CAPABILITY

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 61 days.

(21) Appl. No.: 09/692,020

(22) Filed: Oct. 19, 2000

(51) Int. Cl.[7] ................................................. H02J 1/00
(52) U.S. Cl. ............................ 307/85; 307/43; 307/64; 366/600; 174/59; 174/68.1; 361/327; 361/634; 361/641
(58) Field of Search .............................. 307/64, 85, 43; 361/600, 627, 634, 641; 174/59, 68.1

(56) References Cited

U.S. PATENT DOCUMENTS

| | | |
|---|---|---|
| 2,577,974 A | 12/1951 | McKinley |
| 2,603,546 A | 7/1952 | Lais |
| 2,784,354 A | 3/1957 | Gaubatz |
| 3,123,744 A | 3/1964 | Fisher |
| 3,277,251 A | 10/1966 | Daly |
| 3,284,591 A | 11/1966 | Daly |
| 3,315,556 A | 4/1967 | Speck |
| 3,353,068 A | 11/1967 | Turk |
| 3,361,938 A | 1/1968 | Watson |
| 3,391,374 A | 7/1968 | Schleicher |
| 3,523,166 A | 8/1970 | Daly |
| 3,559,148 A | 1/1971 | Hafer |
| 3,585,456 A | 6/1971 | Phillips, Jr. |
| 3,631,324 A | 12/1971 | Jones |
| 3,636,237 A | 1/1972 | Hafer |
| 3,654,484 A | 4/1972 | Jorgenson et al. |
| 3,716,683 A | 2/1973 | Hafer |
| 3,723,942 A | 3/1973 | Dennison |
| 3,731,256 A | 5/1973 | Hafer |
| 3,739,321 A | 6/1973 | Murphy et al. |
| 3,742,431 A | 6/1973 | Kobyner |
| 3,746,936 A | 7/1973 | Coffey et al. |
| 3,781,765 A | 12/1973 | Schleicher |
| 3,895,179 A | 7/1975 | Wyatt |
| 3,922,053 A | 11/1975 | Hafer |
| 3,949,277 A | 4/1976 | Yosset |
| 4,067,529 A | 1/1978 | Milcoy |
| 4,088,829 A | 5/1978 | Milcoy |
| 4,390,926 A | 6/1983 | Hart |
| 4,450,503 A | 5/1984 | Warner |
| 4,782,427 A | 11/1988 | Marks |
| 4,899,217 A | 2/1990 | MacFadyen et al. |

(List continued on next page.)

OTHER PUBLICATIONS

GENTRAN Catalog, GT1094C, Reliance Time Controls, Inc., 1820 Layard Avenue, Racine, WI 53404, undated.

Primary Examiner—Brian Sircus
Assistant Examiner—Robert L DeBeradinis
(74) Attorney, Agent, or Firm—Andrus, Sceales, Starke & Sawall, LLP

(57) ABSTRACT

A power transfer device adapted for interconnection with the electrical system of a building includes a cabinet, a set of switches mounted to the cabinet, and wires adapted to connect the switches to an electrical distribution panel associated with a building electrical system. The power transfer device includes a compartment associated with the cabinet, and a selectively configurable cover arrangement for interconnection with the cabinet so as to enclose the compartment. The cover arrangement varies according to the characteristics or parameters of the power transfer device, to provide an optional plug-type power input and an optional power input monitoring arrangement, either alone or in combination with each other, or to provide neither capability. The cover arrangement includes a series of differently configured cover sections which can be mounted to the cabinet in varying combinations, so as to vary the capability of the power transfer device.

26 Claims, 2 Drawing Sheets

U.S. PATENT DOCUMENTS

| | | |
|---|---|---|
| 5,045,969 A | 9/1991 | Menasco |
| 5,070,252 A | 12/1991 | Castenschiold et al. |
| 5,070,429 A | 12/1991 | Skirpan |
| RE34,113 E | 10/1992 | Miller et al. |
| 5,233,511 A | 8/1993 | Bilas et al. |
| 5,239,129 A | 8/1993 | Ehrenfels |
| 5,268,850 A | 12/1993 | Skoglund |
| 5,301,086 A | 4/1994 | Harris et al. |
| 5,568,362 A | 10/1996 | Hansson |
| 5,638,256 A | 6/1997 | Leach et al. |
| 5,648,646 A | 7/1997 | Flegel |
| 5,726,507 A | 3/1998 | Tipton |
| 5,761,027 A | 6/1998 | Flegel |
| 5,784,249 A | 7/1998 | Pouliot |
| D400,183 S | 10/1998 | Flegel |
| 5,870,276 A | 2/1999 | Leach et al. |
| 5,895,981 A | 4/1999 | Flegel |
| 5,949,640 A * | 9/1999 | Cameron et al. ........... 361/600 |
| 5,984,719 A | 11/1999 | Flegel |
| 6,031,193 A | 2/2000 | Flegel |
| 6,107,701 A | 8/2000 | Flegel |
| 6,169,340 B1 * | 1/2001 | Jones .......................... 307/64 |

\* cited by examiner

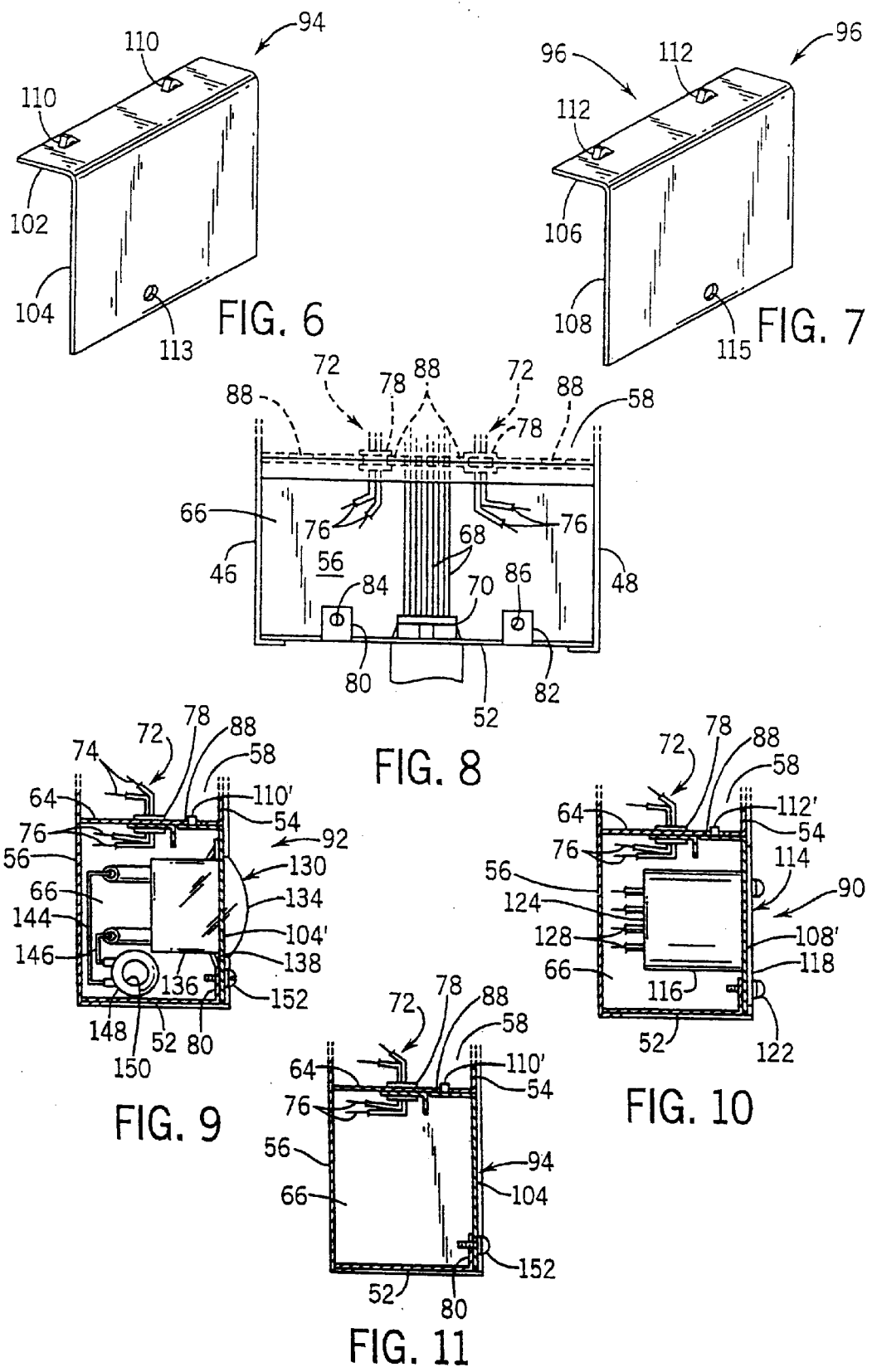

TRANSFER SWITCH WITH SELECTIVELY CONFIGURABLE COVER STRUCTURE WITH POWER INPUT AND METER CAPABILITY

BACKGROUND AND SUMMARY OF THE INVENTION

This invention relates to a power transfer device for providing power to the electrical system of a building, such as power supplied from a standby generator.

Portable generators are used in certain situations to feed electrical power to residential and commercial load circuits during a utility power outage. These systems frequently include a power inlet box adapted for interconnection with the generator. The power inlet box is typically mounted to the exterior of a building. The power inlet box is connected to a transfer switching mechanism which continues the electrical path through circuit breakers associated with the transfer switching mechanism, to supply power to certain selected circuits of the load center as determined by the transfer switching mechanism selector switches. The circuits of the transfer switching mechanism are wired to selected circuits of the load center, through wiring housed within a conduit extending between the load center and the transfer switching mechanism.

The present invention relates to a power transfer arrangement similar to that disclosed in Flegel U.S. Pat. No. 5,895,981 issued Apr. 20, 1999, the disclosure of which is hereby incorporated by reference. In the '981 patent, a power transfer switching mechanism for interposition between a remote power inlet box and the electrical load center of a building includes a terminal compartment for receiving power input wires connected to the remote power inlet box. The switching mechanism includes a cabinet defining an internal cavity within which a series of switches are mounted. The cabinet further defines a terminal compartment, and a terminal assembly is disposed within the terminal compartment. The terminal compartment is accessible through an opening associated with the cabinet, and a cover is selectively positionable over the opening to provide or prevent access to the terminal compartment. A series of wires are interconnected between the terminal assembly and the switches, and power input wiring is received within the terminal compartment and interconnected with the remote power inlet box. The ends of the power input wires are engageable with the terminal assembly for establishing a direct electrical connection between the remote power inlet box and the switches of the switching mechanism.

The present invention also relates to power transfer switching mechanisms such as are disclosed in co-pending U.S. patent application Ser. No. 09/062,257 filed Apr. 17, 1998 and Ser. No. 09/139,154 filed Aug. 24, 1998, the disclosures of which are hereby incorporated by reference. The '257 application discloses a power input terminal arrangement in the power transfer switching mechanism, in combination with a removable cover for preventing access to the power input terminal arrangement. The cover is provided with a power inlet or input structure, such as a socket or receptacle, which can be connected to the terminal assembly for selectively receiving a plug connector electrically interconnected with a source of auxiliary power such as a generator. The power transfer switching mechanism in the '257 application provides a transfer switching mechanism which may have either a plug-type power input connection or a direct or hardwired power input connection between the remote power inlet box and the switches of the switching mechanism. The '154 application differs from the '257 application by disclosing a power transfer switching mechanism having a removable cover provided with a power input indicating structure, such as a pair of watt meters, which may be connected to the terminal assembly for selectively displaying the amount of power supplied to the transfer switching mechanism by the generator. In both the '257 application and the '157 application, a blank cover may be used in place of the cover having the power inlet or input structure of having the power input indicating structure, to provide neither plug-type power input nor power input indicating capabilities.

Co-pending application Ser. No. 09/157,855 filed Nov. 23, 1998, the disclosure of which is hereby incorporated by reference, discloses a power transfer switching mechanism having a removable cover provided with both a power inlet or input structure as well as a power input indicating structure. The power inlet or input structure may be in the form of a socket or receptacle which is adapted for connection to the terminal assembly for selectively receiving a plug connector and supplying power to the power transfer switching mechanism from a source of auxiliary power such as a generator. As discussed above, this feature provides a selective plug-type power input connection rather than a direct or hardwired power input connection between the generator and the power transfer switching mechanism. The power input indicating structure may be in the form of a pair of watt meters as discussed above, to display the amount of power supplied to the power transfer switching mechanism by the generator. The meters are also used to indicate the balance between the two output circuits of the generator and, during initial setup, to measure the total loads on each individual circuit wired into the transfer circuit. The '855 application thus discloses a cover having a combination plug-type power input and power input indicating system which can be selectively interchanged with a blank cover.

Copending application Ser. No. 09/526,237, filed Mar. 15, 2000, discloses an arrangement generally similar to that disclosed in the '257 application as well as the '981 patent, but in which the power input terminal arrangement is replaced with exposed wire leads. The disclosure of the '237 application is hereby incorporated by reference.

While the above-described power transfer switching mechanisms provide extremely convenient and simple arrangements for optionally establishing direct, hardwired and selective plug-type connections with the generator or power inlet box and for optionally pending power input monitoring capability, it is desirable to provide a power transfer switching mechanism which can be quickly and easily equipped with a power input receptacle and/or a meter arrangement, or which can be constructed without either a power input receptacle or a meter arrangement. With this modification, the transfer switching mechanism can be configured to receive a power input plug interconnected with the generator if desired, or can be configured to provide a direct, hardwired connection with a remote power inlet. The transfer switching mechanism can also be selectively configured to enable monitoring of the amount of power provided by the generator during a power outage, so as to prevent overloading of and subsequent damage to the generator or to the building electrical system. Although the broad concepts of integrally providing a power input receptacle and meters on a power transfer switching mechanism are well-known, it is desirable to modify the power transfer switching mechanisms described in the aforementioned patents and patent applications, to provide an optional power input and meter arrangement in a cover assembly which can be selectively engaged with the cabinet of the transfer switching mechanism.

It is an object of the present invention to provide a transfer switching mechanism having a selectively engageable access cover arrangement capable of providing the transfer switching mechanism with a power input arrangement, a meter arrangement, a combination power input arrangement and meter arrangement, or without either a power input arrangement or a meter arrangement, according to the desired configuration and intended use of the transfer switching mechanism. It is a further object of the present invention to provide such a transfer switching mechanism which is generally similar in construction and operation to known transfer switching mechanisms. It is a further object of the present invention to provide a method for efficiently constructing a power transfer switching mechanism having interchangeable access covers for providing desired functions such as a receptacle-type power input for supplying power from the generator, and a meter panel for monitoring power input from the generators. Yet another object of the invention is to provide such a transfer switching mechanism in which a power input or meter arrangement can be installed or removed at the time of manufacture or at the time of field installation, or retrofitted at a time after installation, at the discretion of the installer or user.

In accordance with the invention, a power transfer arrangement is adapted for interconnection in the building electrical system for supplying power from a generator to the electrical system. The power transfer arrangement includes a power inlet arrangement for interconnection with the generator for receiving power therefrom, and a power transfer device separate from the power inlet arrangement adapted for interconnection with the building electrical system. The invention resides in a power input connection arrangement, such as a terminal arrangement or exposed wire leads in the power transfer device, in combination with a selectively configurable cover system adapted for engagement with the power transfer device for preventing access to the power input connection arrangement. In one form, the power transfer device includes a cabinet having a panel to which is mounted a set of switches for controlling the supply of power from the power transfer device to the building electrical system, and the set of switches are electrically connected to the power input connection arrangement. The power input connection arrangement may be in the form of a set of power input terminals or exposed wire leads located within a power input compartment defined by the cabinet at a location spaced from the set of switches. The cabinet defines an open area which provides access to the power terminal compartment.

The cover system according to the invention contemplates a pair of separate cover members or sections which are selectively engageable with the power transfer device over the open area of the power transfer device cabinet, for selectively preventing access to the power input compartments. Each cover member or section is engageable with the power transfer device cabinet separately from the other, and the cover members or sections cooperate to enclose the open area of the power transfer device cabinet when the cover members or sections are engaged with the power transfer device cabinet.

The cover members or sections may be blank, having nothing more than mounting structure and wall structure which cooperate to mount the cover section to the cabinet and enclose a portion of the open area, or the cover sections may carry certain components useful in operation of the power transfer device, such as a power input member in the form of a socket or a receptacle, or a power input indicating arrangement such as a power meter. The invention contemplates that the pair of cover members or sections which are mounted to the cabinet may be selected from a group of cover sections which includes first, second and third differently configured cover sections. Representatively, each of the first cover sections includes a power input arrangement, each of the second cover sections includes a power input indicating arrangement, and each of the third cover sections is a blank cover section. The pair of cover sections which are selected for mounting to the cabinet over the open area are selected according to the design parameters or operating characteristics of the power transfer device.

In one version, a pair of third (blank) cover sections may be selected and mounted to the cabinet over the open area, when it is not desired to provide the power transfer device with either a power input socket or receptacle, or with a power input indicating arrangement. In this version, power is typically supplied to the power transfer device from the generator by wiring a remote power inlet directly to the set of wire leads or terminals contained within the power input compartment, and the blank cover sections simply allow access to the set of wire leads or terminals for establishing the direct connection, and enclose the open area so as to prevent access to the power input compartment after the direct connection has been made.

In another version, the selected pair of cover sections include a third (blank) cover section and a first cover section, which includes a power input arrangement. In this version, the power input arrangement, typically a socket or receptacle, is wired to the set of wire leads or terminals and the first cover section is mounted to the cabinet so as to enclose a portion of the open area. The third (blank) cover section is mounted to the cabinet so as to enclose the remainder of the open area. This version is employed when it is desired to provide a plug-type connection to supply power from the generator to the power transfer device.

In another version, the selected pair of cover sections include a third (blank) cover section and a second cover section, which includes a power input indicating arrangement such as a meter. In this version, the meter is interconnected with the set of wire leads or terminals or with the power input wiring from the remote power inlet arrangement, and the second cover section is mounted to the cabinet so as to enclose a portion of the open area. The third (blank) cover section is mounted to the cabinet to enclose the remainder of the open area. This version is employed when it is desired to provide the capability to monitor power supplied to the power transfer device by the generator.

In yet another version, the selected pair of cover sections include a first cover section and a second cover section, to provide both power input and power indicating capability. In this version, the power input arrangement, such as the socket or receptacle, is wired either to the meter or to the set of wire leads or terminals, and the meter is then wired to the set of terminals or is otherwise interconnected with the power input wiring. In a construction in which the power input socket or receptacle is wired to the wire leads or terminals, a power sensor such as a current transformer is interconnected with the meter and is positioned so as to detect current in the wiring which extends between the power input socket or receptacle and the set of wire leads or terminals. In a construction in which the socket or receptacle is connected to the meter, wires from the meter are then connected to the set of wire leads or terminals for inputting power to the power transfer device from the socket or receptacle through the meter. When mounted to the cabinet, the first and second cover sections cooperate to enclose the open area to prevent access to the power input compartment.

With this arrangement, the cover structure of the power transfer device can be varied to provide different functions and operating characteristics for the same basic construction of the power transfer device. That is, a common set of power transfer device components can form the basis for constructing a power transfer device having different functions and characteristics, according to the cover sections which are selected and mounted to the base components of the power transfer device.

The invention also contemplates a method of constructing a power transfer device, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIGS. 6 and 7 are isometric views illustrating cover sections utilized in creating the cover constructions illustrated in FIGS. 2–5;

FIG. 8 is a partial, front elevation view showing the bottom portion of the power transfer arrangement of FIG. 1 with the cover sections removed;

FIG. 9 is a partial section view taken along line 9—9 of FIG. 2;

FIG. 10 is a partial section view taken along line 10—10 of FIG. 3; and

FIG. 11 is a partial section view taken along line 11—11 of FIG. 5.

DETAILED DESCRIPTION OF THE INVENTION

Figure 1:
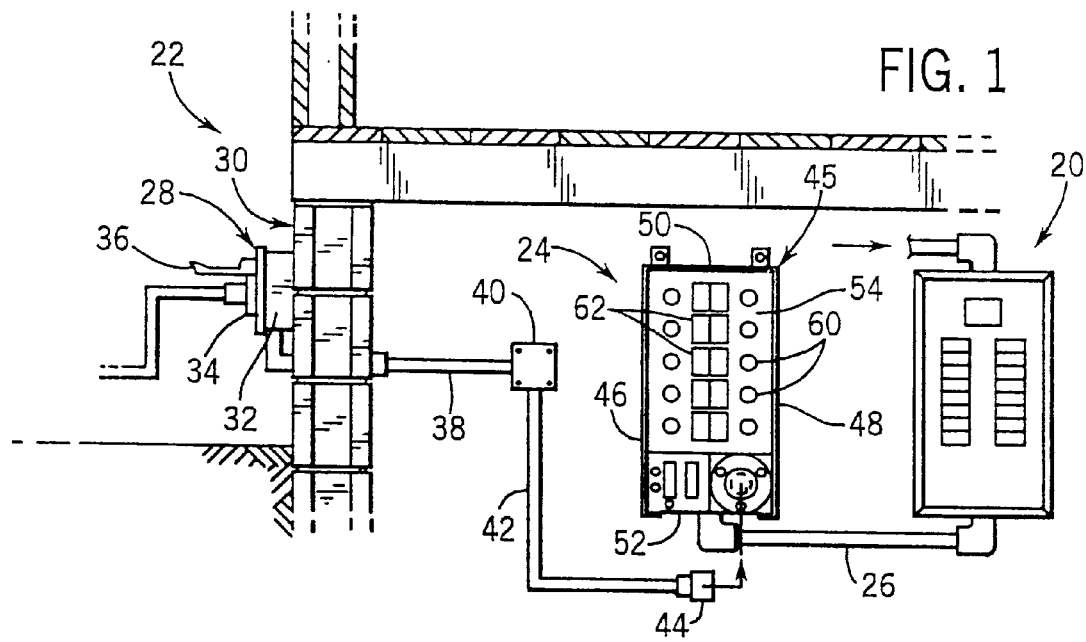
FIG. 1 is a schematic representation showing the power transfer arrangement constructed according to the invention for interposition between a remote power inlet arrangement fed by a portable power generator and an electrical panel associated with a building.

FIG. 1 shows a power inlet arrangement, generally similar to that disclosed in the above-referenced patents and/or applications, for interconnecting a portable generator with a main electrical panel or load center 20 located in the interior of a building 22. In the power inlet arrangement of FIG. 1, a manual power transfer switching mechanism 24 constructed in accordance with the invention is mounted adjacent load center 20 and is interconnected therewith via a series of wires enclosed by a conduit 26 extending between load center 20 and switching mechanism 24.

A power inlet box 28 is mounted to the wall of building 22, which is shown at 30. Power inlet box 28 includes an external housing including a series of walls such as 32, and a recessed power inlet 34 mounted to a front wall of the housing. A cover 36 is mounted to the front wall of the housing via a hinge structure, and is movable between an open position as shown in FIG. 1, and a closed position in which cover 36 encloses recessed power inlet 34 when not in use. A conduit 38 extends from inlet box 28 into the interior of building 22. Conduit 38 may be connected to a junction box 40 mounted to an interior wall of building 22. In this embodiment, a flexible cord 42 is attached at one end to junction box 40, and flexible cord 42 includes a plug-type connector 44 at its opposite end which is adapted for engagement with a power inlet of power transfer switching mechanism 24, as will be explained. Appropriate connections are made within junction box 40 between cord 42 and the wiring contained within conduit 38, so as to establish and electrical path between power inlet box 28 and cord connector 44. Alternatively, as disclosed in U.S. Pat. No. 5,895,981, junction box 40, cord 42 and connector 44 may be eliminated and conduit 38 may be routed directly to power transfer switching mechanism 24, such that wires contained within conduit 38 can be connected directly to power input terminals or wire leads located within power transfer switching mechanism 24. In this construction, power is supplied directly from power inlet box 28 to power transfer switching mechanism 24 without a plug-type connection as is provided by connector 44.

While the drawings illustrate a conduit, such as 38, extending from inlet box 28 and connected to junction box 40 or connected to power transfer switching mechanism 24 as explained, it is understood that any other approved wiring method may be utilized, such as encased wiring conventionally known as nonmetallic-sheathed cable, for establishing a connection between inlet box 28 and junction box 40 or power transfer switching mechanism 24.

Referring to FIGS. 1 and 8, switching mechanism 24 includes a cabinet 45 defining a pair of side walls 46, 48, a top wall 50 extending between the upper ends of side walls 46, 48, a bottom wall 52 extending between and interconnecting the lower ends of side walls 46, 48, a partial height front panel 54 and a rear panel 56. Walls 46–52, in combination with front panel 54 and rear panel 56, define an upper cavity 58 which receives a series of circuit breakers 60 and switches 62 mounted to front panel 54, in a manner as is known.

Referring to FIGS. 9–11, front panel 54 is bent rearwardly at is lower end to form an intermediate transverse wall 64 which defines the lower extent of upper cavity 58. A lower power input compartment 66 is defined by intermediate transverse wall 64 in combination with bottom wall 52, the lower portions of side walls 46, 48 and the lower portion of rear panel 56. Lower power input compartment 66 is accessible through an opening or open area located below the lower extent of front panel 54.

Output wires from switches 62, shown at 68, extend through lower power input compartment 66 to a conduit fitting 70 secured to bottom wall 52 in a conventional manner, for routing output wires 68 through conduit 26 to load center 20. Other wires extend through lower compartment 66, such as neutral and ground wires, as well as input wires from load center 20.

As shown in FIGS. 8–11, switching mechanism 24 includes a series of wires which include end sections 74, two of which are interconnected with switches 62 through circuit breakers 60, and lower ends 76 located within lower compartment 66. Another of wires 72 is a neutral wire adapted for connection to a neutral wire included in wires 68. Wires 72 further include a ground wire which is connected to both the frame of switching mechanism 24 and to a ground wire included in wires 68. Wires 72 may be interconnected with transverse wall 64 utilizing grommets 78. Alternatively, wires 72 may be interconnected through transverse wall 64 or other mounting structure having a transverse wall, such as is disclosed in the above-referenced '237 application. Alternatively, in place of wire lower ends 76, wires 72 may be connected to a terminal block or the like secured to structure such as transverse wall 64, in accordance with the disclosure of U.S. Pat. No. 5,895,981.

A pair of mounting tabs 80, 82 extend upwardly from cabinet bottom wall 52 into the open area through which lower power input compartment 66 is accessible. Mounting tabs 80, 82 are provided with threaded openings 84, 86, respectively.

A series of aligned slots 88 are formed in transverse wall 64, slightly inwardly from the intersection of transverse wall 64 with front panel 54.

Referring to FIGS. 2–7, a series of cover sections or members 90, 92, 94 and 96 are provided for engagement with cabinet 45 of switching mechanism 24 so as to selectively enclose the open area of cabinet 45 which provides access to lower compartment 66. Cover member 90 includes a power inlet arrangement 98, cover member 92 includes a power input indicating arrangement 100, and cover members 94, 96 are blank cover members. In a manner to be explained, cover members 90–96 are engageable in various combinations with cabinet 45 of switching mechanism 24 so as to vary the characteristics and operation of switching mechanism 24.

As shown in FIGS. 6 and 7, cover members 94, 96 are very similar in construction, and defines an inverted L-shape in cross-section. Cover member 94 defines an upper transverse ledge or wall 102 and a depending wall 104. Similarly, cover member 96 includes an upper transverse ledge or wall 106 and a depending wall 108. Tabs 110 extend upwardly from transverse upper wall 102 of cover member 94, and tabs 112 extend upwardly from upper transverse wall 106 of cover member 96. An opening 113 is formed in depending wall 104 of cover member 94, slightly offset to the left of center of wall 104. An opening 115 is formed in depending wall 108 of cover member 96, and is substantially centrally located relative to depending wall 108.

Depending walls 104, 108 are dimensioned such that each of walls 104, 108 occupies half of the open area of cabinet 45 which provides access to lower compartment 66. Tabs 110 are positioned and configured so as to be engageable within two of slots 88 on the left side of lower compartment 66, with reference to FIG. 8, and tabs 112 are positioned and configured so as to be engageable within the two slots 88 on the right side of lower compartment 66. When positioned in this manner, opening 113 in depending wall 104 of cover member 94 is in alignment with opening 84 in mounting tab 80, and opening 115 in depending wall 108 of cover member 96 is in alignment with opening 86 of mounting tab 82.

Cover member 90 has the same structure as cover member 96 as shown and described with respect to FIG. 7, with power inlet 98 mounted thereto, and primed reference characters will be used to facilitate clarity. An opening is formed in depending wall 108' of cover member 90, and a power input socket, shown generally at 114, is engaged with wall 108' at the opening. Socket 114 is of conventional construction for receiving a plug connector in a power transfer panel, and includes a cylindrical socket body 116 and a circular collar 118. Cylindrical socket body 116 extends through the opening in depending wall 108' such that circular collar 118 overlies and engages the front surface of wall 108'. A pair of threaded fasteners 120 extend through openings in collar 118 and into engagement with threaded openings formed in depending wall 108', to mount socket 114 to wall 108'. In addition, an opening is formed in collar 118 in alignment with the opening in wall 108' which corresponds to opening 115 in wall 108, and is adapted to receive a fastener 122 which extends therethrough and into engagement with opening 86 in mounting tab 82 adjacent socket 114, for securing socket 114 to wall 108'.

Cylindrical socket body 116 defines an outwardly open internal cavity which is closed at its inner end by an end wall 124. A series of male prongs 126 extend from end wall 124 into the internal cavity defined by socket body 116. Power input wires 128 are interconnected with prongs 126. Wires 128 include power, neutral and ground wires interconnected with wire ends 76 and other wires and components as is known, or with a set of input terminals in place of wire ends 76, for establishing an electrical connection between prongs 126 and switches 62, as well as with neutral and ground components or wires.

In a manner as is known, prongs 126 are adapted for engagement with the female end of plug connector 44. In this arrangement, plug connector 44 is engaged with prongs 126 for supplying power to power transfer switching mechanism 24 from an electrical generator through power inlet box 28. Alternatively, a plug connector such as 44 may extend directly from the generator through an opening in wall 30, such as a window, so as to bypass inlet box 28. In this arrangement, the cord extends directly from the generator to power transfer switching mechanism 24, and the plug connector such as 44 is engageable with prongs 126 for supplying power directly to power transfer switching mechanism 24 from the generator.

Cover member 92 has the same structure as cover member 94 as shown and described with respect to FIG. 6, and primed reference characters will be used to facilitate clarity. Cover member 92 includes power input indicating structure in the form of a pair of spaced apart watt meters 130, 132 which are employed to display the amount of power supplied to power transfer switching mechanism 24, such as from a standby generator. Each of watt meters 130, 132 has a convexly shaped forward portion 134 integrally attached to a block-shaped rear portion 136. Each forward portion 134 extends through a respective rectangular opening formed in wall 104', and is attached to the inside of wall 104' by one of a pair of spring-biased retainers 138. Each forward portion 134 defines a transparent window having a support member for mounting a wattage scale 140 visible through the window, and an indicator 142 mounted for movement along scale 140 in response to the supply of generator power. Each rear portion 136 extends rearwardly and perpendicularly to wall 104' and is provided with wires 144, 146 interconnected with a current transformer 148 defining an opening 150.

Cover members 90, 92, 94 and 96 are adapted to be selectively mounted to the base components of power transfer switching mechanism 24 for selectively providing a plug-type power input, a power input monitoring capability, alone or in combination, or for providing neither plug-type input nor power input monitoring. Cover members 90–96 can be installed during manufacture, either at an OEM facility or at a distributorship or contractor facility, or can be retrofitted in the field during or after installation.

Figures 2, 3:
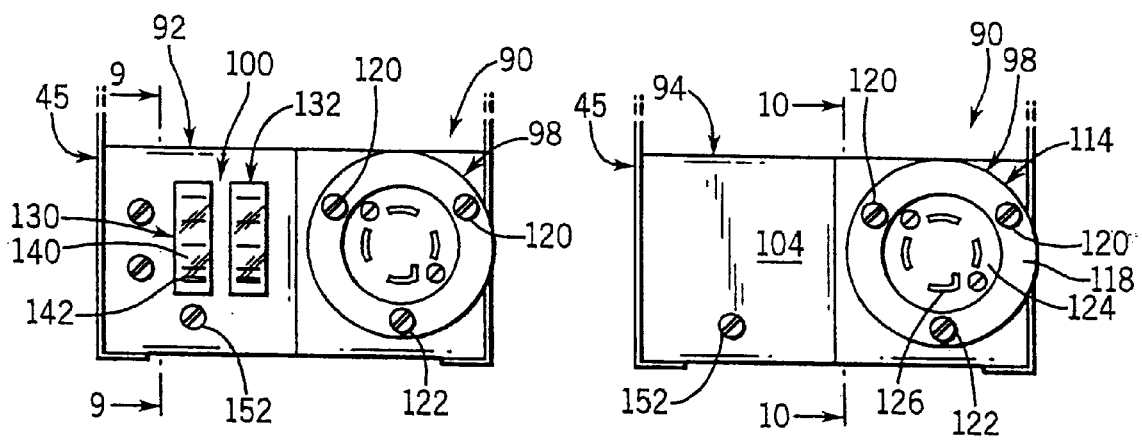
FIG. 2 is a partial front elevation view showing the bottom portion of the power transfer arrangement of FIG. 1 with a cover construction including both a power input arrangement and a power input indicating arrangement.
FIG. 3 is a view similar to FIG. 2, showing a cover construction providing a power input arrangement only.

To provide a combination plug-type power input capability as well as power input monitoring capability, both cover members 90 and 92 are secured to cabinet 45 of power transfer switching mechanism 24 as shown in FIG. 2. Wires 128 of power inlet arrangement 98 are secured to wire ends 76 and other wires and components as is known, or with a set of input terminals utilized in place of wire ends 76, to establish an electrical connection between power inlet arrangement 98 and switches 62, as well as with neutral and ground components or wires. Two of the wires 128 are routed one each through opening 150 of each current transformer 148 such that, when power is supplied through wires 128, each current transformer 148 provides an input to each watt meter 130 indicative of the amount of power being supplied to power transfer switching mechanism 24 from the generator. Alternatively, power inlet arrangement 98 may be wired directly to watt meters 130, 132, which in turn may be connected to wire ends 76 or to terminals utilized in place of wire ends 76. Cover member 90 is secured in position on power transfer switching mechanism 24 by engaging tabs 112' within the rightward pair of slots 88 and then inserting fastener 122 through the opening in collar 118, as well as through the opening in wall 108' corresponding to opening 115, and into engagement with threaded opening 86 in mounting tab 82. Similarly, cover member 92 is mounted to power transfer switching mechanism 24 by engaging tabs 110' within the leftward pair of slots 88, and passing the shank of a fastener 152 through the opening in wall 104' which corresponds to opening 113, and into engagement with threaded opening 84 in mounting tab 80.

To provide a socket-type power input only, cover member 94 is mounted to the cabinet of switching mechanism 24 along with cover member 90, as shown in FIG. 3. In this version, cover member 90 is secured as described above, and cover member 94 is engaged with cabinet 45 of power transfer switching mechanism 24 in the same manner as cover member 92, by inserting tabs 110 into the leftward pair of slots 88 and employing fastener 152 to secure wall 104 to mounting tab 80. With this construction, cover members 90, 94 cooperate to fully enclose the open area which provides access to lower compartment 96.

Figures 4, 5:
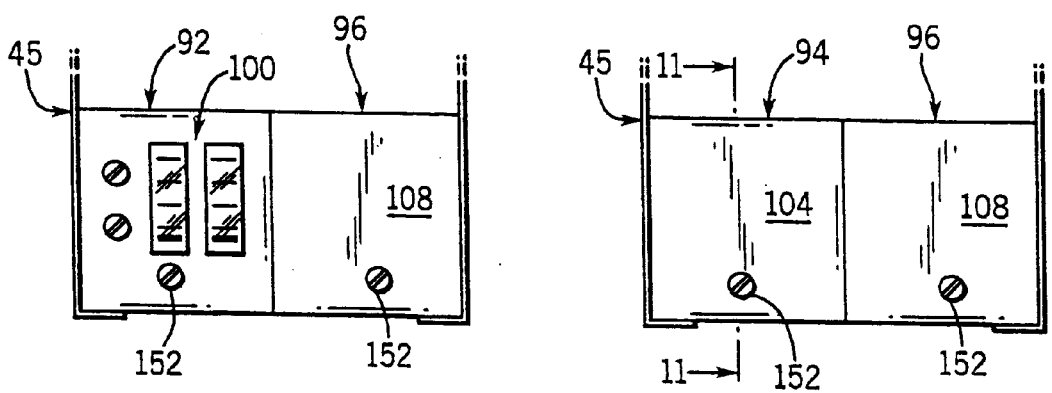
FIG. 4 is a view similar to FIGS. 2 and 3, showing a cover construction providing a power input indicating arrangement only.
FIG. 5 is a view similar to FIGS. 2–4, illustrating a cover construction which is blank and provides neither a power input arrangement nor a power input indicating arrangement.

To provide a power transfer switching mechanism having power input indicating capability only, cover member 92 is employed in combination with cover member 96, as shown in FIG. 4. In this version, cover member 92 is secured as described above, and cover member 96 is engaged with cabinet 45 of power transfer switching mechanism 24 in the same manner as cover member 90, by inserting tabs 112 into the rightward pair of slots 88 and employing a fastener such as 152 to secure wall 108 to mounting tab 82. Plug-type connector such as 44 is eliminated, and wires are fed directly through a knock-out opening in one of the cabinet walls of power transfer switching mechanism 24 into lower compartment 66, for direct engagement with wires ends 76 or terminals utilized in place of wire ends 76. Two of the input wires are routed one each through opening 150 of each current transformer 148, which provides an input to watt meters 130, 132 so as to indicate the amount of power supplied to power transfer switching mechanism 24. Cover member 92, in combination with cover member 96, cooperate to fully enclose the open area which provides access to lower compartment 66.

When it is desired to provide neither plug-type power input nor power input monitoring, cover members 94 and 96 are utilized in combination as shown in FIG. 5. In this version, fasteners 152 extend through openings 113, 115 of walls 104, 108, respectively, and into engagement with threaded openings 84, 86, respectively. Cover members 94 and 96 function to fully enclose the open area of cabinet 45 through which lower compartment 96 is accessible. As with the version of FIG. 4, power input wires are passed through a knock-out opening in one of the walls of cabinet 45 into lower compartment 66, and are connected to wire ends 76 or to terminals utilized in place of wire ends 76.

It can thus be appreciated that the invention provides a versatile arrangement by which various capabilities can be incorporated in a power transfer switching mechanism, utilizing various combinations of cover members for mounting over an open area defined by the cabinet.

While the mounting arrangement by which the various cover members are mounted to the cabinet is illustrated as a tab and slot arrangement in combination with a fastener, it is understood that any other satisfactory releasable or permanent mounting arrangement may be employed. Further, while the drawings illustrate the cover members as having a configuration which corresponds to the configuration of the open area through which the compartment is accessible, it is also understood that the cover members may take other shapes so long as the cover members include surface areas sufficient to enclose the opening through which the compartment is accessible. In addition, while the invention has been described with respect to mounting of either a socket-type power input or a power input indicating arrangement, it is understood that other types of components may be fitted to a transfer switching mechanism utilizing the same type of variably configurable cover system as shown and described, to further enhance the versatility and configurability of the power transfer switching mechanism.

Various alternatives and embodiments are contemplated as being within the scope of the following claims particularly pointing out and distinctly claiming the subject matter regarded as the invention.

I claim:

1. In a power transfer device for supplying power from a generator to the electrical system of a building, wherein the power transfer device is adapted for interconnection with the building electrical system, the improvement comprising:

a power input compartment associated with the power transfer device, wherein the power input compartment is accessible through an open area defined by a shortened front panel on the power transfer device;

a power input connection arrangement located within the power input compartment; and a cover arrangement which is selectively engageable with the power transfer device over the open area of the power transfer device for selectively preventing access to the power input connection arrangement, wherein the cover arrangement includes at least a pair of separate cover sections, wherein each of the cover sections is engageable with the power transfer device separately from the other and wherein the cover sections cooperate to enclose the open area of the power transfer device when the cover sections are engaged with the power transfer device.

2. The improvement of claim 1, wherein the power transfer device includes a cabinet having a panel to which is mounted a set of switches for controlling the supply of power from the power transfer device to the building electrical system, wherein the set of switches are electrically connected to the power input connection arrangement.

3. The improvement of claim 2, wherein the power input connection arrangement is adapted for use in establishing a direct electrical connection between the power transfer device and a power inlet arrangement interconnected with the generator, wherein the power input compartment and the power input connection arrangement are at a location spaced from the set of switches.

4. The improvement of claim 1, wherein the pair of cover sections are selected from a group comprising first, second and third differently configured cover sections, wherein each first cover section includes a power input arrangement, each second cover section includes a power input indicating arrangement, and each third cover section is substantially blank.

5. The improvement of claim 4, wherein the power input connection arrangement is adapted for use in establishing a direct electrical connection between the power transfer device and a power inlet arrangement interconnected with the generator, and wherein the pair of separate cover sections comprise a pair of third cover sections engaged with the power transfer device.

6. The improvement of claim 4, wherein the power input connection arrangement is adapted for use in establishing a direct electrical connection between the power transfer device and a power inlet arrangement interconnected with the generator, and wherein the pair of separate cover sections comprise a second cover section and a third cover section, wherein the power input indicating arrangement of the second cover section is interconnected with the power input connection arrangement.

7. The improvement of claim 4, wherein the pair of cover sections include a first cover section, wherein the power input arrangement of the first cover section is interconnected with the power input connection arrangement.

8. The improvement of claim 7, wherein the pair of cover sections further includes a second cover section, wherein the power input arrangement of the first cover section is interconnected with the power input indicating arrangement of the second cover section which in turn is interconnected with the power input connection arrangement.

9. The improvement of claim 8, wherein the pair of cover sections further includes a third cover section which cooperates with the first cover section to enclose the open area of the power transfer device.

10. The improvement of claim 4, wherein the power transfer device includes a cabinet within which the power input compartment is located and wherein the cabinet defines the open area through which the power input compartment is accessible, and further comprising mounting structure associated with the cabinet and located adjacent the open area, wherein the pair of cover sections are engageable with the mounting structure for engaging the pair of cover sections with the power transfer device.

11. The improvement of claim 10, wherein the mounting structure comprises a pair of mounting tabs, wherein each of the pair of cover sections is secured to one of the mounting tabs by means of a mechanical fastener.

12. The improvement of claim 11, wherein the mounting structure further includes mating engagement structure, spaced from the mounting tabs, provided on the cabinet and the pair of cover sections.

13. In a power transfer device adapted for interconnection with the electrical system of a building and including a cabinet with a front panel secured thereto, a set of switches mounted to the cabinet, and a first set of wires for connecting the switches to an electrical distribution panel associated with the building electrical system, the improvement comprising:

a power input compartment associated with the cabinet wherein the power input compartment is accessible through an open area defined by the cabinet when the front panel is secured thereto, a power input connection arrangement located within the power input compartment, and a cover arrangement removably connected to the cabinet over the power input compartment, wherein the cover arrangement includes at least a pair of separate, cover members, wherein each of the cover members are engageable with the power transfer device separately from the other and wherein the pair of cover members cooperate to enclose the power input compartment when the pair of cover members are engaged with the power transfer device.

14. The improvement of claim 13, wherein each cover member includes a wall section and wherein the wall sections of the cover members enclose the open area of the cabinet when the cover members are connected to the cabinet.

15. The improvement of claim 14, wherein a power input arrangement is secured to the wall section of one of the cover members, and wherein the power input arrangement is connected to the power input connection arrangement and is adapted to receive a plug member interconnected with a source of auxiliary power for supplying power to the building electrical system through the power transfer device.

16. The improvement of claim 14, wherein a power input indicating arrangement is secured to the wall section of one of the cover members, and wherein the power input indicating arrangement is interconnected with the power input connection arrangement and is adapted for interconnection with a series of wires interconnected with a source of auxiliary power for supplying power to the building electrical system through the power transfer device.

17. The improvement of claim 14, wherein a power input arrangement is secured to the wall section of a first one of the cover members and wherein a power input indicating arrangement is secured to the wall section of a second one of the cover members, wherein the power input arrangement is interconnected with the power input connection arrangement and is adapted to receive a plug member interconnected with a source of auxiliary power for supplying power to the building electrical system through the power transfer device, and wherein the power input indicating arrangement is operable to provide an output indicative of the amount of power supplied to the power transfer device by the source of auxiliary power.

18. The improvement of claim 14, wherein the pair of cover members are selected from a group consisting of first, second and third differently configured cover members, wherein each first cover member includes a power input arrangement, each second cover member includes a power input indicating arrangement, and each third cover member is a substantially blank cover member.

19. A method of constructing a power transfer device for supplying power from a generator to the electrical system of a building, the method comprising the steps of:

providing a cabinet having a compartment within which a power input connection arrangement is located, wherein the cabinet defines an open area providing access to the power input connection arrangement;

equipping the cabinet with a shortened panel defining the open area, the panel including a plurality of switches electrically connected to the power input connection arrangement for controlling the supply of power from the power transfer device to the building electrical system;

providing a series of cover sections, wherein each cover section includes closure structure which is dimensioned so as to define an area less than the open area defined by the cabinet and wherein the cover sections include a first cover section having a power input arrangement, a second cover section having a power input indicating arrangement and a third cover section having a blank wall; and mounting at least a pair of the cover sections to the cabinet over the compartment, wherein the pair of cover sections cooperate to close the open area to prevent access to the compartment.

20. The method of claim 19, wherein the step of mounting at least a pair of the cover sections to the cabinet is carried out by securing the cover sections to the cabinet utilizing mounting structure associated with the cabinet located adjacent the open area.

21. The method of claim 20, wherein the mounting structure includes mating engagement structure associated with the cabinet and with each of the cover sections, in combination with a mounting member adapted to receive a mechanical fastener at a location spaced from the mating engagement structure.

22. The method of claim 19, wherein the step of mounting at least a pair of the cover sections to the cabinet is carried out by mounting selected first, second or third cover sections to the cabinet.

23. The method of claim 22, wherein the step of mounting at least a pair of the cover sections to the cabinet is carried out by mounting a first cover section and a third cover section to the cabinet over the open area.

24. The method of claim 22, wherein the step of mounting at least a pair of the cover sections to the cabinet is carried out by mounting a first cover section and a second cover section to the cabinet over the open area.

25. The method of claim 22, wherein the step of mounting at least a pair of the cover sections to the cabinet is carried out by mounting a second cover section and a third cover section to the cabinet over the open area.

26. The method of claim 22, wherein the step of mounting at least a pair of the cover sections to the cabinet is carried out by mounting a pair of third cover sections to the cabinet over the open area.

* * * * *